United States Patent [19]
Kishi et al.

[11] Patent Number: 5,297,264
[45] Date of Patent: Mar. 22, 1994

[54] MICROPROGRAM-CONTROLLED DEVICE COMPRISING A CONTROL STORAGE DEVICE WITH A SMALL STORAGE CAPACITY

[75] Inventors: Takao Kishi; Kiyoshi Iwase, both of Tokyo, Japan

[73] Assignee: NEC Corporation, Tokyo, Japan

[21] Appl. No.: 872,406

[22] Filed: Apr. 23, 1992

[30] Foreign Application Priority Data

Apr. 26, 1991 [JP] Japan ................... 3-123098

[51] Int. Cl.$^5$ .................... G06F 9/26; G06F 9/40
[52] U.S. Cl. .................... 395/375; 395/400; 395/425; 395/800; 364/261.3; 364/261; 364/938
[58] Field of Search ............... 395/375, 725, 800, 400, 395/425

[56] References Cited

U.S. PATENT DOCUMENTS

| 4,062,058 | 12/1977 | Haynes | 395/400 |
| 4,155,120 | 5/1979 | Keefer | 395/375 |
| 4,338,661 | 7/1982 | Tredennick | 395/375 |
| 4,430,706 | 2/1984 | Sand | 395/375 |
| 4,679,141 | 7/1987 | Pomerene | 395/375 |
| 4,764,861 | 8/1988 | Shibuya | 395/375 |
| 4,984,154 | 1/1991 | Hanatani | 395/375 |
| 5,008,807 | 4/1991 | Krmeger | 395/375 |

Primary Examiner—David Y. Eng
Attorney, Agent, or Firm—Foley & Lardner

[57] ABSTRACT

In a microprogram-controlled device operable under the control of a microprogram, a control storage device (10) comprises a control storage unit (11) memorizing a plurality of microinstructions each including a plurality of every second microinstruction addresses in number less than the maximum number of available branches for the microprogram. A bank switching unit (12) selects, as a selected microinstruction (SMI), one of the next microinstructions on the basis of a branch information signal (BI). A microinstruction register (13) holds the selected microinstruction as a current microinstruction. A branch control unit (15) processes a branch condition signal (BCD), a branch control signal (BCT), a branch classification signal (BCF), and a branch condition selection signal (BCS) into the branch information signal, an address selection signal (AS), and an address modifying signal (AM). An address selector (16) selects, as a selected microinstruction address (SMIA), one of the every second microinstruction addresses on the basis of the address selection signal. An address modifier (17) modifies the selected microinstruction address into a modified microinstruction address (MMIA) on the basis of the address modifying signal and an address modifying selection signal (AMS). The address modifier supplies an address register (14) with the modified microinstruction address.

5 Claims, 8 Drawing Sheets

MICROPROGRAM-CONTROLLED DEVICE COMPRISING A CONTROL STORAGE DEVICE WITH A SMALL STORAGE CAPACITY

BACKGROUND OF THE INVENTION

This invention relates to an information processing system operable under the control of a microprogram and, in particular, to a microprogram-controlled device for carrying out sequence control for the microprogram.

As well known in the art, a microprogram-controlled device is operable under the control of a microprogram. A known microprogram-controlled device comprises a control storage device for memorizing a plurality of microinstructions which compose the microprogram. Each of the microinstructions includes a next microinstruction address for next microinstruction to be executed following a current microinstruction which is currently executed. Read from the control storage device, the next microinstruction includes the next microinstruction address which is modified into a modified microinstruction address on the basis of a branch condition signal and then the modified microinstruction address is directly held in a next microinstruction address register as a held microinstruction address. The next microinstruction address register supplies the control storage device with the held microinstruction address as the next microinstruction address to make the control storage device produce the next microinstruction. Such an address method for the microprogram-controlled device is called a next address method. This is because each microinstruction includes a next microinstruction address.

In order to make the microprogram-controlled device operate at a high speed, the control storage device has been operated in a state where the control storage device is accessed at an access time which is nearly equal to a cycle time of which the microprogram-controlled device has an operation clock. Under the circumstances, a microinstruction register temporarily holds the next microinstruction read from the control storage device to compensate a delay of an access speed for the control storage device and each microinstruction includes a plurality of every second microinstruction addresses for microinstructions to be executed two steps after the current microinstruction. The every second microinstruction address is a next microinstruction address but one. Such an address method for the microprogram-controlled device is referred to an every second address method.

In a conventional microprogram-controlled device adopting the every second address method, each microinstruction includes the every second microinstruction addresses which are equal in number to the maximum number of available branches for the microprogram. As a result, degradation of performance due to the branches can be prevented by using the every second microinstruction address corresponding to each branch.

As described above, in the conventional microprogram-controlled device adopting the every second address method, it is necessary for each microinstruction to include the every second microinstruction addresses which are equal in number to the maximum number of available branches for the microprogram. Therefore, each microinstruction has a longer bit length. Accordingly, the conventional microprogram-controlled device adopting the every second address method is defective in that the control storage device has a large storage capacity.

SUMMARY OF THE INVENTION

It is therefore an object of this invention to provide a microprogram-controlled device which comprises a control storage device having a small storage capacity.

Other objects of this invention will become clear as the description proceeds.

On describing the gist of an aspect of this invention, it is possible to understand that a microprogram-controlled device is operable under the control of a microprogram.

According to an aspect of this invention, the above-understood microprogram-controlled device comprises a control storage device comprising a control storage unit for memorizing a plurality of microinstructions which compose the microprogram. Each of the microinstructions includes a plurality of every second microinstruction addresses for microinstructions to be executed two steps after a current microinstruction being currently executed, branch classification information indicative of a classification of a branch, branch condition selection information indicative of a selection of branch conditions, and address modifying selection information indicative of whether or not the every second microinstruction addresses are modified. The every second microinstruction addresses are in number less than the maximum number of available branches for the microprogram. The control storage unit simultaneously produces a plurality of next microinstructions in response to a next microinstruction address. The control storage device comprises a microinstruction selecting arrangement for selecting, as a selected microinstruction, one of the next microinstructions on the basis of a branch information signal. Connected to the control storage device, a microinstruction register holds the selected microinstruction as the current microinstruction. The microinstruction register produces the every second microinstruction addresses, a branch classification signal indicative of the branch classification information, a branch condition selection signal indicative of the branch condition selection information, and an address modifying selection signal indicative of the address modifying selection information. Connected to the control storage device, a next microinstruction address register holds the next microinstruction address for the next microinstructions to be executed following the current microinstruction. The next microinstruction address register supplies the next microinstruction address to the control storage unit to make the control storage unit produce the next microinstructions. The next microinstruction address register produces a part of the next microinstruction address as a branch control signal. Supplied with a branch condition signal, and connected to the microinstruction register, the next microinstruction address register, and the control storage device, a branch control unit processes the branch condition signal, the branch control signal, the branch classification signal, and the branch condition selection signal into the branch information signal, an address selection signal, and an address modifying signal. Connected to the microinstruction register and the branch control unit, an every second microinstruction address selector selects, as a selected microinstruction address, one of the every second microinstruction addresses on the basis of the address selection signal. Connected to the every second microinstruction address selector, the branch control unit, the microinstruction register, and the next microinstruction address register, an every second microinstruction address modifier modifies the selected microinstruction address into a modified microinstruction address on the basis of the address modifying signal and the address modifying selection signal. The every second microinstruction address modifier supplies the next microinstruction address register with the modified microinstruction address.

According to another aspect of this invention, the afore-understood microprogram-controlled device comprises a control storage device comprising a control storage unit for memorizing a plurality of microinstructions which compose the microprogram. Each of the microinstructions includes an every second microinstruction address for microinstructions to be executed two steps after a current microinstruction being currently executed, branch classification information indicative of a classification of a branch, branch condition selection information indicative of a selection of branch conditions, and address modifying selection information indicative of whether or not the every second microinstruction address is modified. The control storage unit simultaneously produces a plurality of next microinstructions in response to a next microinstruction address. The control storage device comprises a microinstruction selecting arrangement for selecting, as a selected microinstruction, one of the next microinstructions on the basis of a branch information signal. Connected to the control storage device, a microinstruction register holds the selected microinstruction as the current microinstruction. The microinstruction register produces the every second microinstruction address, a branch classification signal indicative of the branch classification information, a branch condition selection signal indicative of the branch condition selection information, and an address modifying selection signal indicative of the address modifying selection information. Connected to the control storage device, a next microinstruction address register holds the next microinstruction address for the next microinstructions to be executed following the current microinstruction. The next microinstruction address register supplies the next microinstruction address to the control storage unit to make the control storage unit produce the next microinstructions. The next microinstruction address register produces a part of the next microinstruction address as a branch control signal. Supplied with a branch condition signal and connected to the microinstruction register, the next microinstruction address register, and the control storage device, a branch control unit processes the branch condition signal, the branch control signal, the branch classification signal, and the branch condition selection signal into the branch information signal and an address modifying signal. Connected to the branch control unit, the microinstruction register, and the next microinstruction address register, an every second microinstruction address modifier modifies the every second microinstruction address into a modified microinstruction address on the basis of the address modifying signal and the address modifying selection signal. The every second microinstruction address modifier supplies the next microinstruction address register with the modified microinstruction address.

DESCRIPTION OF THE PREFERRED EMBODIMENTS

Figure 1:
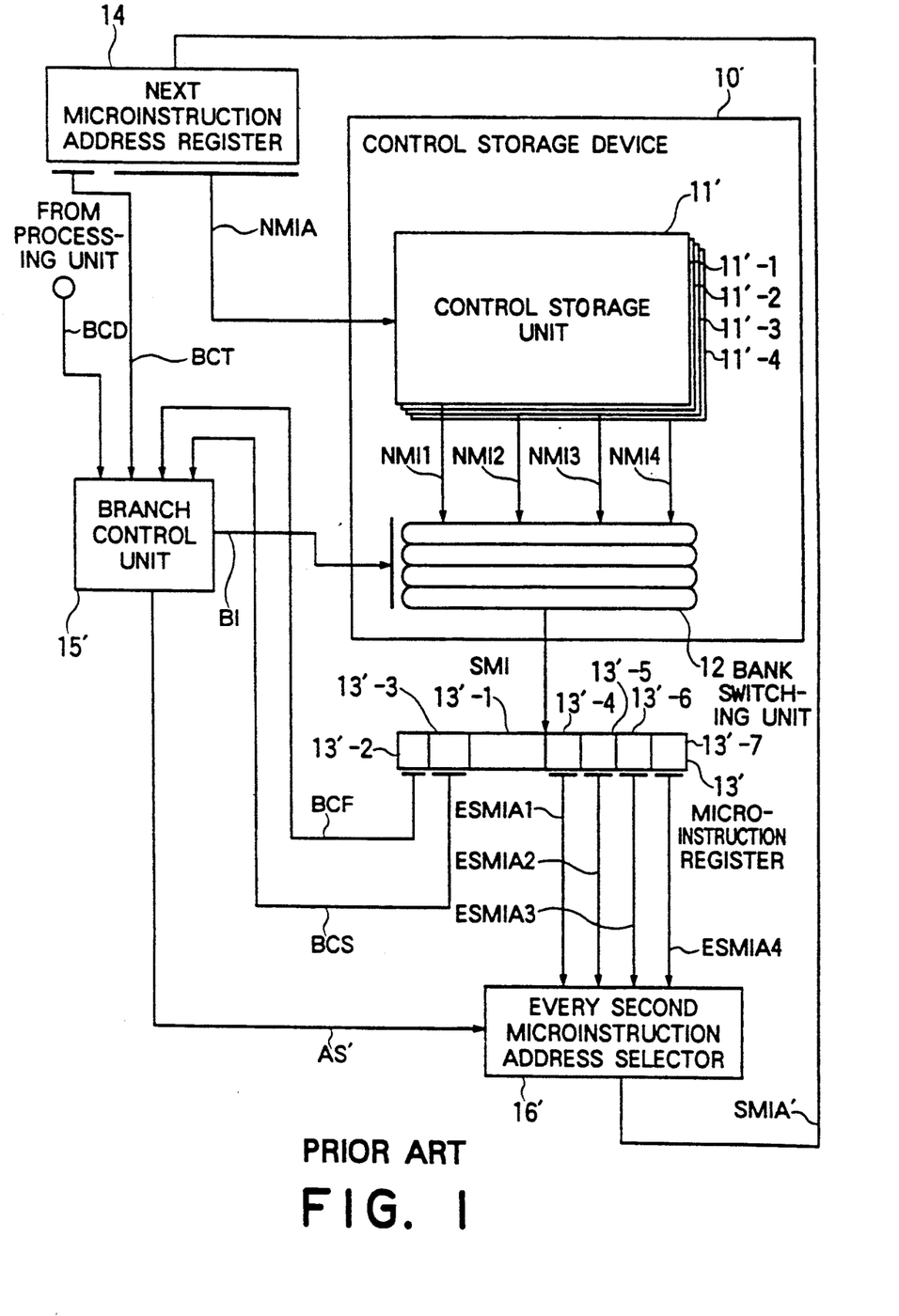
FIG. 1 is a block diagram of a conventional microprogram-controlled device.

Referring to FIG. 1, a conventional microprogram-controlled device will be described at first in order to facilitate an understanding of the present invention. The microprogram-controlled device is operable under the control of a microprogram. In the manner which will later become clear, the microprogram can branch to a maximum four-way or quadridirectional.

The microprogram-controlled device comprises a control storage device 10'. The control storage device 10' comprises a control storage unit 11'. The control storage unit 11' consists of four banks or first through fourth banks 11'-1, 11'-2, 11'-3, and 11'-4 and memorizes or stores a plurality of microinstructions which compose the microprogram. In the manner which will later become clear, each of the microinstructions stored in the control storage unit 11' includes first through fourth every second microinstruction addresses which are equal in number to the maximum number or four of available branches for the microprogram.

In the manner which will later become clear, the control storage unit 11' is accessed by a next microinstruction address NMIA to simultaneously produce first through fourth next microinstructions NMI1, NMI2, NMI3, and NMI4 by the first through the fourth banks 11'-1 to 11'-4, respectively. Each of the first through the fourth next microinstructions NMI1 to NMI4 is a microinstruction to be executed following a current microinstruction being currently executed. The first through the fourth next microinstructions NMI1 to NMI4 are supplied to a bank switching unit 12. The bank switching unit 12 is supplied with a branch information signal BI which will be described as the description proceeds. On the basis of the branch information signal BI, the bank switching unit 12 selects one of the first through the fourth next microinstructions NMI1 to NMI4 as a selected microinstruction SMI. In other words, the bank switching unit 12 allows the control storage device 10' to be switched between the first through the fourth banks 11'-1 to 11'-4. The bank switching unit 12 therefore serves as a microinstruction selecting arrangement.

The selected microinstruction SMI is supplied to a microinstruction register 13'. The microinstruction register 13' holds the selected microinstruction SMI as the current microinstruction.

Figure 2:
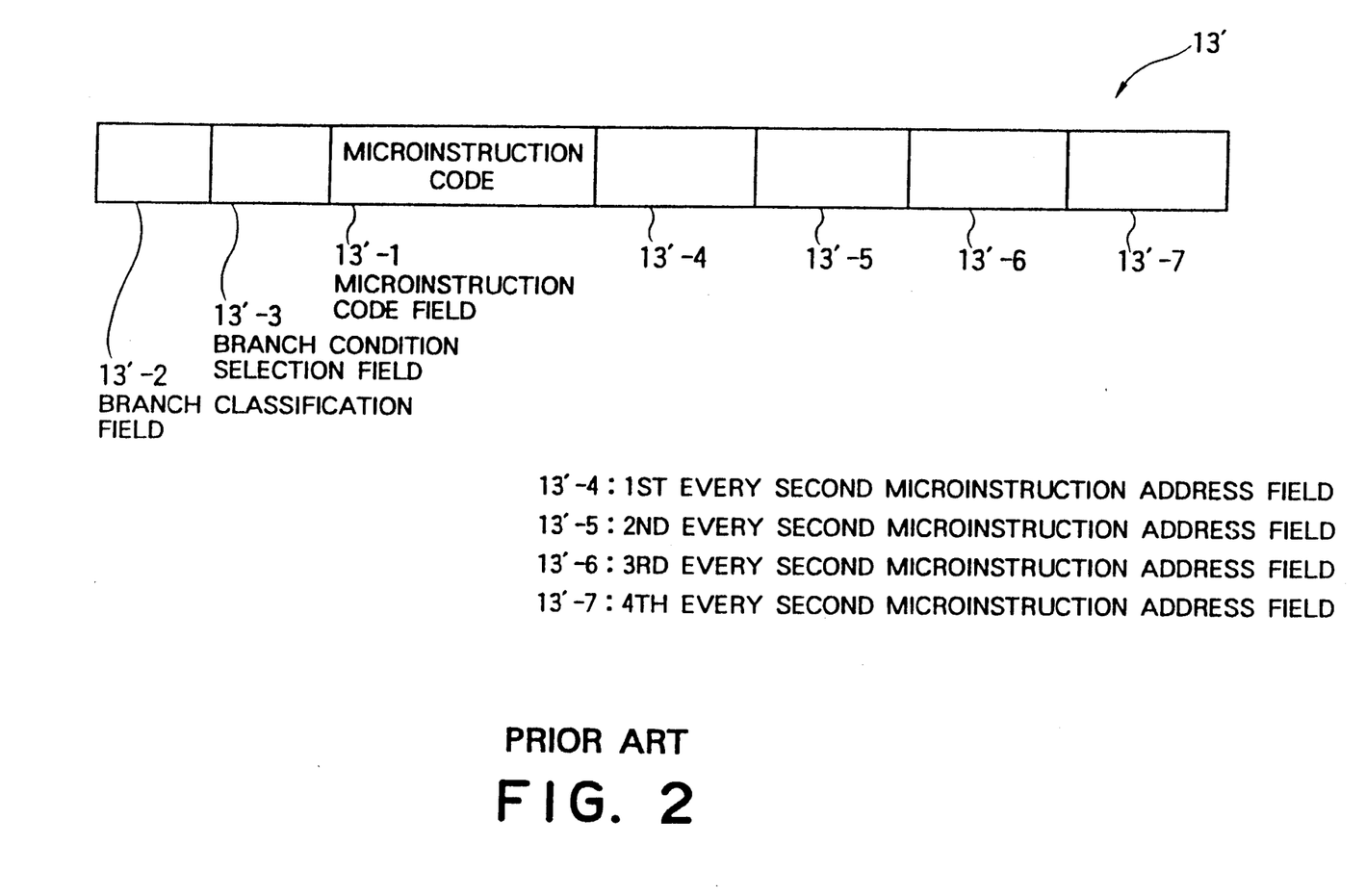
FIG. 2 is a view for use in describing a microinstruction register included in the conventional microprogram-controlled device illustrated in FIG. 1.

Turning to FIG. 2, the microinstruction register 13' is divided into seven fields, namely, a microinstruction code field 13'-1, a branch classification field 13'-2, a branch condition selection field 13'-3, and first through fourth every second microinstruction address fields 13'-4, 13'-5, 13'-6, and 13'-7 which are depicted also in FIG. 1. The microinstruction code field 13'-1 is for storing a microinstruction code. The branch classification field 13'-2 is for storing branch classification information indicative of a classification of a branch. The branch condition selection field 13'-3 is for storing branch condition selection information indicative of a selection of branch conditions. The first through the fourth every second microinstruction address fields 13'-4 to 13'-7 are for storing first through fourth every second microinstruction addresses for every second microinstructions to be executed two steps after the current microinstruction.

In other words, each microinstruction for use in the conventional microprogram-controlled device consists of the microinstruction code, the branch classification information, the branch condition selection information, and the first through the fourth every second microinstruction addresses.

Turning back to FIG. 1, the microinstruction register 13' produces a microinstruction code signal indicative of the microinstruction code. The microinstruction code signal is supplied to a processing unit such as an adder (not shown). The processing unit processes the microinstruction code signal to produce a branch condition signal BCD. The microinstruction register 13' furthermore produces a branch classification signal BCF indicative of the branch classification information in the branch classification field 13'-2, a branch condition selection signal BCS indicative of the branch condition selection information in the branch condition selection field 13'-3, and the first through the fourth every second microinstruction addresses ESMIA1, ESMIA2, ESMIA3, and ESMIA4 in the first through the fourth every second microinstruction address fields 13'-4 to 13'-7.

The microprogram-controlled device further comprises a next microinstruction address register 14 connected to the control storage device 10'. The next microinstruction address register 14 holds the next microinstruction address NMIA for the next microinstructions. The next microinstruction address register 14 supplies the next microinstruction address NMIA to the control storage unit 11' to make the control storage unit 11' produce the first through the fourth next microinstructions NMI1 to NMI4. The next microinstruction address register 14 furthermore produces a part of the next microinstruction address NMIA as a branch control signal BCT.

The branch control signal BCT is supplied to a branch control unit 15'. The branch control unit 15' is supplied with the branch condition signal BCD from the processing unit. The branch control unit 15' is furthermore supplied with the branch classification signal BCF and the branch condition selection signal BCS from the microinstruction register 13'. The branch control unit 15' processes the branch condition signal BCD, the branch control signal BCT, the branch classification signal BCF, and the branch condition selection signal BCS into the branch information signal BI and an address selection signal AS'.

The address selection signal AS' is supplied to an every second microinstruction address selector 16'. The every second microinstruction address selector 16' is supplied with the first through the fourth every second microinstruction addresses ESMIA1 to ESMIA4 from the microinstruction register 13'. The every second microinstruction address selector 16' selects, as a selected microinstruction address SMIA', one of the first through the fourth every second microinstruction addresses ESMIA1 to ESMIA4 on the basis of the address selection signal AS'. The selected microinstruction address SMIA' is supplied to the next microinstruction address register 14. Therefore, the next microinstruction address register 14 holds the selected microinstruction address SMIA' as the next microinstruction address NMIA.

As apparent from the above description, in the conventional microprogram-controlled device, the control storage unit 11' must memorize the microinstructions each including the first through the fourth every second microinstruction addresses which are equal in number to the maximum number of available branches for the microprogram. As a result, the conventional microprogram-controlled device is defective in that the control storage device 10' has a large storage capacity, as mentioned in the preamble of the instant specification.

Figure 3:
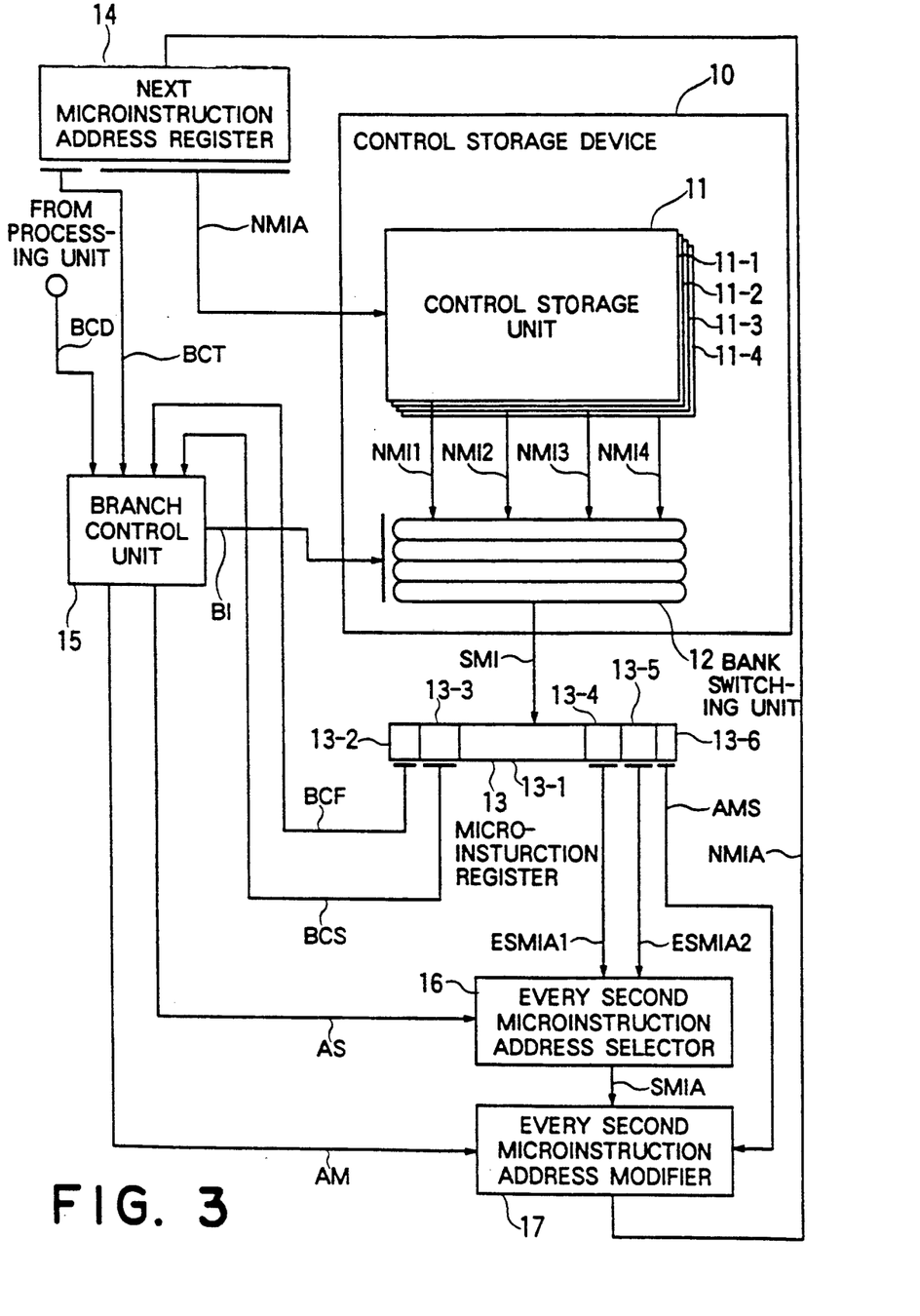
FIG. 3 is a block diagram of a microprogramcontrolled device according to a first embodiment of the instant invention.

Referring to FIG. 3, the description will proceed to a microprogram-controlled device according to a first embodiment of this invention. The microprogramcontrolled device comprises an every second microinstruction address modifier 17 as well as a control storage device 10, a microinstruction register 13, a next microinstruction address register 14, a branch control unit 15, and an every second microinstruction address selector 16 which are similar to those in the conventional microprogram-controlled device illustrated in FIG. 1. In the manner which will later become clear, the microprogram-controlled device can carry out, as a branch for a microprogram, a one-way or unidirectional branch, a two-way or bidirectional branch, and a four-way or quadridirectional branch.

Temporarily referring to FIGS. 4(a) and (b), the description will be made as regards a distinction of each branch in a case where the microprogram branches.

Figure 4A:
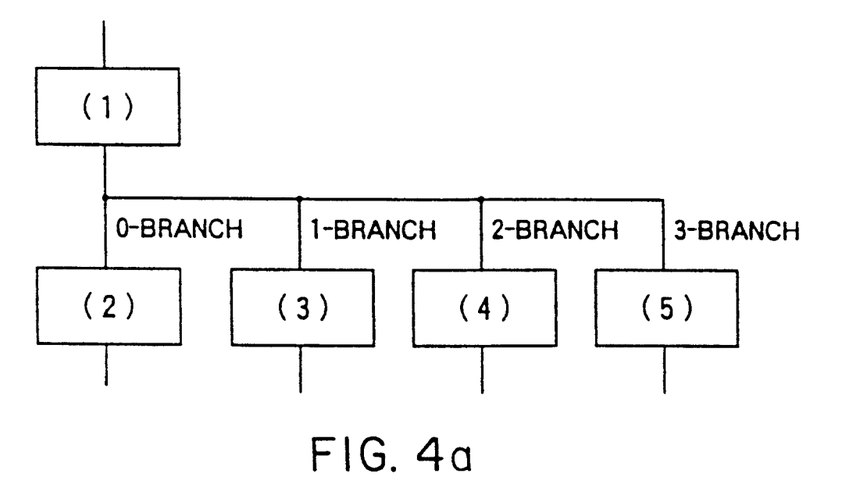
FIGS. 4(a) and (b) are flow diagrams for use in describing branches for a microprogram of which the microprogram-controlled device is operable under the control.
Figure 4B:
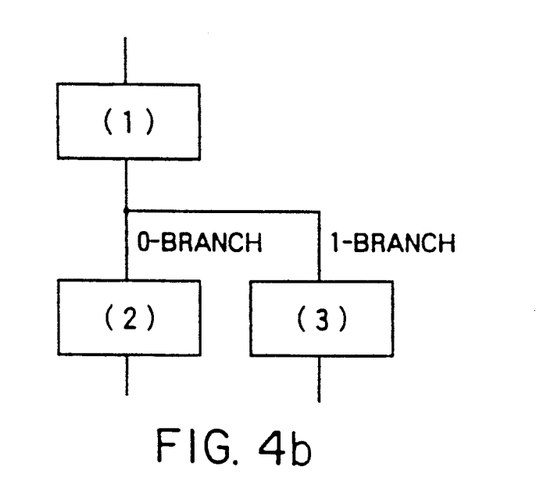

FIG. 4(a) shows a case where the microprogram can branch from a microinstruction (1) to one of four microinstructions (2), (3), (4), and (5). In this event, a branch from the microinstruction (1) to the microinstruction (2), another branch from the microinstruction (1) to the microinstruction (3), a still another branch from the microinstruction (1) to the microinstruction (4), and a yet another branch from the microinstruction (1) to the microinstruction (5) are called a 0-branch, a 1-branch, a 2-branch, and a 3-branch, respectively.

FIG. 4(b) shows another case where the microprogram can branch from a microinstruction (1) to one of two microinstructions (2) and (3). Under the circumstances, a branch from the microinstruction (1) to the microinstruction (2) and another branch from the microinstruction (1) to the microinstruction (3) are referred to the 0-branch and the 1-branch, respectively.

Turning back to FIG. 3, the control storage device 10 comprises a control storage unit 11 and a bank switching unit 12 which are similar to those in the conventional microprogram-controlled device illustrated in FIG. 1. The control storage unit 11 consists of four banks or first through fourth banks 11-1, 11-2, 11-3, and 11-4 and memorizes or stores a plurality of microinstructions which compose the microprogram. In the manner which will later become clear, each of the microinstructions stored in the control storage unit 11 includes first and second every second microinstruction addresses.

In the manner which will later become clear, the control storage unit 11 is accessed by a next microinstruction address NMIA to simultaneously produce first through fourth next microinstructions NMI1, NMI2, NMI3, and NMI4 by the first through the fourth banks 11-1 to 11-4, respectively. Each of the first through the fourth next microinstructions NMI1 to NMI4 is a microinstruction to be executed following a current microinstruction being currently executed. The first through the fourth next microinstructions NMI1 to NMI4 are supplied to the bank switching unit 12. The bank switching unit 12 is supplied with a branch information signal BI which will be described as the description proceeds. On the basis of the branch information signal BI, the bank switching unit 12 selects one of the first through the fourth next microinstructions NMIS1 to NMI4 as a selected microinstruction SMI. In other words, the bank switching unit 12 allows the control storage device 10 to be switched between the first through the fourth banks 11-1 to 11-4. The bank switching unit 12 therefore serves as a microinstruction selecting arrangement.

The selected microinstruction SMI is supplied to the microinstruction register 13. The microinstruction register 13 holds the selected microinstruction SMI as the current microinstruction.

Figure 5:
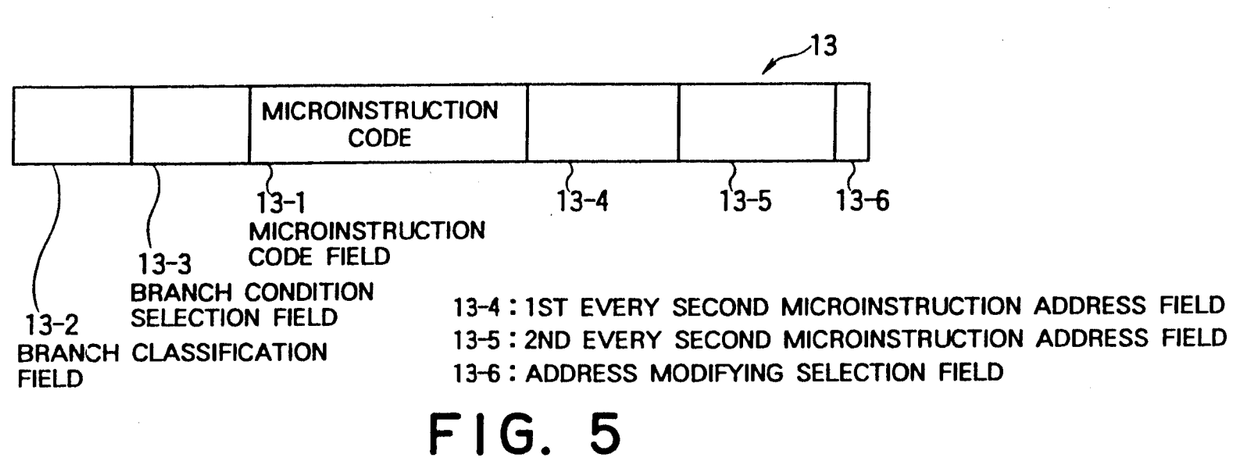
FIG. 5 is a view for use in describing a microinstruction register included in the microprogram-controlled device illustrated in FIG. 3.

Turning to FIG. 5, the microinstruction register 13 is divided into six fields, namely, a microinstruction code field 13-1, a branch classification field 13-2, a branch condition selection field 13-3, first and second every second microinstruction address fields 13-4 and 13-5, and an address modifying selection field 13-6 which are depicted also in FIG. 3. The microinstruction code field 13-1 is for storing a microinstruction code. The branch classification field 13-2 is for storing branch classification information indicative of a classification of a branch. The branch condition selection field 13-3 is for storing branch condition selection information indicative of a selection of branch conditions. The first and the second every second microinstruction address fields 13-4 and 13-5 are for storing first and second every second microinstruction addresses for every second microinstructions to be executed two steps after the current microinstruction. The address modifying selection field 13-6 is for storing address modifying selection information indicative of whether or not the first and the second every second microinstruction addresses are modified.

In other words, each microinstruction for use in the microprogram-controlled device consists of the microinstruction code, the branch classification information, the branch condition selection information, the first and the second every second microinstruction addresses, and the address modifying selection information.

More specifically, the branch classification field 13-2 is a field for storing information indicative of the classification of the branch of a microinstruction or information designating one of the one-way branch, the two-way branch, and the four-way branch. The branch condition selection field 13-3 is a field for storing information indicating one selection from a plurality of branch condition signals when the information in the branch classification field 13-2 designates the two-way branch and indicating two selection from a plurality of branch condition signals when the information in the branch classification field 13-2 designates the four-way branch. The first every second microinstruction address field 13-4 is a field for storing information indicating an address in case of the one-way branch, an address of the 0-branch in case of the two-way branch, or addresses of the 0-branch and the 2-branch in case of the four-way branch. The second every second microinstruction address field 13-5 is a field for storing information indicating an address of the 1-branch in case of the two-way branch or addresses of the 1-branch and the 3-branch in case of the four-way branch. The address modifying selection field 13-6 is a field for storing information indicative of whether or not the first and the second every second microinstruction addresses in the first and the second every second microinstruction address fields 13-4 and 13-5 are modified when the information in the branch classification field 13-2 designates the four-way branch.

Turning back again to FIG. 3, the microinstruction register 13 produces a microinstruction code signal indicative of the microinstruction code in the microinstruction code field 13-1. The microinstruction code signal is supplied to a processing unit such as an adder (not shown). The processing unit processes the microinstruction code signal to produce a branch condition signal BCD. The microinstruction register 13 furthermore produces a branch classification signal BCF indicative of the branch classification information in the branch classification field 13-2, a branch condition selection signal BCF indicative of the branch condition selection information in the branch condition selection field 13-3, the first and the second every second microinstruction addresses ESMIA1 and ESMIA2 in the first and the second every second microinstruction address fields 13-4 and 13-5, and an address modifying selection signal AMS indicative of the address modifying selection information in the address modifying selection field 13-6.

The next microinstruction address register 14 holds the next microinstruction address NMIA for the next microinstructions. The next microinstruction address register 14 supplies the next microinstruction address NMIA to the control storage unit 11 to make the control storage unit 11 produce the first through the fourth next microinstructions NMI1 to NMI4. The next microinstruction address register 14 furthermore produces a part of the next microinstruction address NMIA as a branch control signal BCT.

Figure 6:
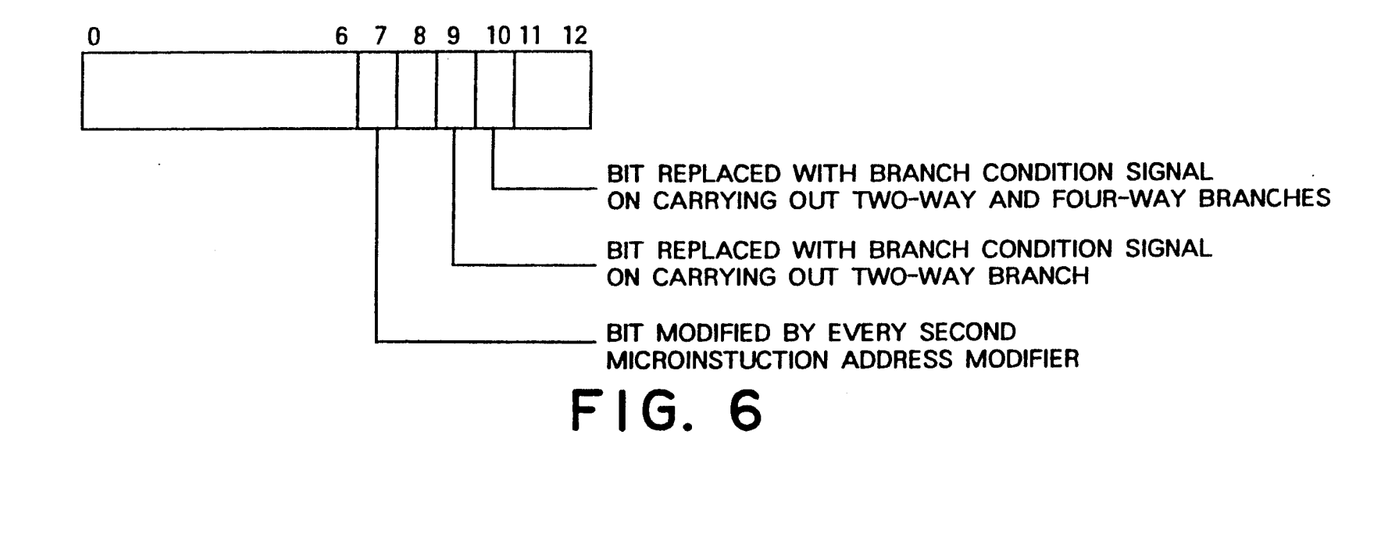
FIG. 6 shows a format of each every second microinstruction address included in each microinstruction stored in a control storage unit included in the microprogram-controlled device illustrated in FIG. 3.

Turning to FIG. 6 in addition to FIG. 3, in the example being illustrated, each every second microinstruction address included in the microinstruction consists of thirteen bits which are arranged from bit 0 or a most significant bit (MSB) to bit 12 or a least significant bit (LSB). Eleven bits in the every second microinstruction address, which is a sum of bit 0 to bit 8, bit 11, and bit 12, are used as a readout address for microinstructions stored in the control storage unit 11. In other words, the next microinstruction address register 14 supplies the readout address in the next microinstruction address NMIA to the control storage unit 11 to make the control storage unit 11 read the first through the fourth microinstructions NMI1 to NMI4 out of the readout address. The next microinstruction address register 14 supplies the branch control unit 15 with two bits of bit 9 and bit 10 in the every second microinstruction address as the branch control signal BCT. The bit 9 and the bit 10 in the every second microinstruction address are used on carrying out the one-way and the two-way branches. More particularly, the bit 9 and the bit 10 in the every second microinstruction address are bits replaced with the branch condition signal on carrying out the four-way branch. The bit 10 in the every second microinstruction address is a bit replaced with the branch condition signal on carrying out the two-way branch. In other words, the bit 9 in the every second microinstruction address is used on carrying out the two-way branch while the bit 9 and the bit 10 in the every second microinstruction address are used on carrying out the one-way branch. The bit 7 in the every second microinstruction address is a specific bit modified into a logic "1" level by the every second microinstruction address modifier 17.

Furthermore turning back to FIG. 3, the branch control unit 15 is supplied with the branch condition signal BCD from the processing unit. The branch control unit 15 is also supplied with the branch control signal BCT from the next microinstruction address register 14. The branch control unit 15 is furthermore supplied with the branch classification signal BCF and the branch condition selection signal BCS from the microinstruction register 13. The branch control unit 15 processes the branch condition signal BCD, the branch control signal BCT, the branch classification signal BCF, and the branch condition selection signal BCS into the branch information signal BI, an address selection signal AS, and an address modifying signal AM. The branch information signal BI indicates an address for one of the first through the fourth banks 11-1 to 11-4 that corresponds to the microinstruction to be branched.

The branch control unit 15 produces, as the address selection signal AS, a signal of the logic "0" level in case of the one-way branch. In case of the two-way branch, the branch control unit 15 produces, as the address selection signal AS, a signal of the logic "0" level if a branch is the 0-branch while the branch control unit 15 produces, as the address selection signal AS, a signal of the logic "1" level if a branch is the 1-branch. In case of the four-way branch, the branch control unit 15 produces, as the address selection signal AS, a signal of the logic "0" level if a branch is either the 0-branch or the 2-branch while the branch control unit 15 produces, as the address selection signal AS, a signal of the logic "1" level if a branch is either the 1-branch or the 3-branch. That is, the address selection signal AS has a logic value according to Table 1.

TABLE 1

| | address selection signal AS | | | | | |
|---|---|---|---|---|---|---|
| | two-way branch | | four-way branch | | | |
| one-way branch | 0-branch | 1-branch | 0-branch | 1-branch | 2-branch | 3-branch |
| 0 | 0 | 1 | 0 | 1 | 0 | 1 |

The branch control unit 15 produces, as the address modifying signal AM, a signal of the logic "0" level on carrying out either the one-way branch or the two-way branch. The branch control unit 15 produces, as the address modifying signal AM, a signal of the logic "1" level on carrying out the four-way branch. That is, the address modifying signal AM has a logic value according to Table 2.

TABLE 2

| address modifying signal AM | | |
|---|---|---|
| one-way branch | two-way branch | four-way branch |
| 0 | 0 | 1 |

The every second microinstruction address selector 16 is supplied with the address selection signal AS from the branch control unit 15. The every second microinstruction address selector 16 is also supplied with the first and the second every second microinstruction address ESMIA1 and ESMIA2 from the microinstruction register 13. The every second microinstruction address selector 16 selects, as a selected microinstruction address SMIA, one of the first and the second every second microinstruction addresses ESMIA1 and ESMIA2 on the basis of the address selection signal AS'

More specifically, the every second microinstruction address selector 16 produces the first every second microinstruction address ESMAI1 as the selected microinstruction address SMIA when the address selection signal AS has the logic "0" level. The every second microinstruction address selector 16 produces the second every second microinstruction address ESMIA2 as the selected microinstruction address SMIA when the address selection signal AS has the logic "1" level.

The every second microinstruction address modifier 17 is supplied with the selected microinstruction address SMIA from the every second microinstruction address selector 16. The every second microinstruction address modifier 17 is also supplied with the address modifying signal AM from the branch control unit 15. The every second microinstruction address modifier 17 is furthermore supplied with the address modifying selection signal AMS from the microinstruction register 13. The every second microinstruction address modifier 17 modifies the selected microinstruction address SMIA into a modified microinstruction address MMIA on the basis of the address modifying signal AM and the address modifying selection signal AMS. The every second microinstruction address modifier 17 supplies the next microinstruction address register 14 with the modified microinstruction address MMIA. Therefore, the next microinstruction address register 14 holds the modified microinstruction address MMIA as the next microinstruction address NMIA.

More particularly, the every second microinstruction address modifier 17 carries out no address modification to the selected microinstruction address SMIA when one of the address modifying signal AM and the address modifying selection signal AMS has the logic "0" level. The every second microinstruction address modifier 17 carries out an address modification to the selected microinstruction address SMIA when both of the address modifying signal AM and the address modifying selection signal AMS have the logic "1" level. In other words, the every second microinstruction address modifier 17 sets the logic "1" level in the specific bit, namely, the bit 7 of the selected microinstruction address SMIA as shown in FIG. 7.

With this microprogram-controlled device, it is possible to designate junctions and separations of addresses for a microinstruction to be executed after the four-way branch by using a pair of the every second microinstruction addresses ESMIA1 and ESMIA2 and the address modifying selection signal AMS.

Turning to FIGS. 7(a) to (d), the description will proceed to practical operations of the microprogram-controlled device thus far described with reference to FIGS. 3 through 6.

Figure 7A:
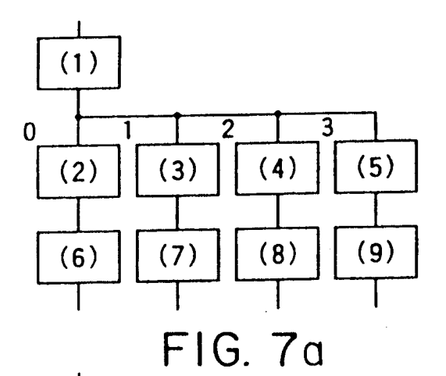
FIGS. 7(a), (b), (c), and (d) are flow diagrams for use in describing practical operation of the microprogram-controlled device described with reference to FIGS. 3 through 6.

FIG. 7(a) shows a practical operation of the microprogram-controlled device. It will be assumed that the microinstruction register 13 holds a current instruction (1) including the first and the second every second microinstruction addresses EAMIA1 and EAMIA2 which indicate addresses of decimal 128 and 512, respectively. In other words, the first every second microinstruction addresses EAMIA1 has all bits equal to the logic "0" level except for only bit 5 of the logic "1" level while the second every second microinstruction addresses EAMIA2 has all bits equal to the logic "0" level except for only bit 3 of the logic "1" level.

Under the circumstances, the every second microinstruction address selector 16 selects, as the selected microinstruction address SMIA, the first every second microinstruction address EAMIA1 of decimal 128 when a branch is either the 0-branch or the 2-branch. The every second microinstruction address selector 16 selects, as the selected microinstruction address SMIA, the second every second microinstruction address EAMIA2 of decimal 512 when a branch is either the 1-branch or the 3-branch.

If the address modifying selection field 13-6 of the microinstruction register 13 produces the address modifying selection signal AMS of the logic "0" level, the every second microinstruction address modifier 17 produces the modified microinstruction address MMIA indicative of either the address of decimal 128 or the address of decimal 512, thereby the microprogram branches either a microinstruction (6) or a microinstruction (8).

If the address modifying selection field 13-6 of the microinstruction register 13 produces the address modifying selection signal AMS of the logic "1" level, the every second microinstruction address modifier 17 produces the modified microinstruction address MMIA indicative off either an address of decimal 160 or an address of decimal 544, thereby the microprogram branches either a microinstruction (7) or a microinstruction (9). This is because the bit 7 in the selected microinstruction address SMIA is modified into the logic "1" level by the every second microinstruction address modifier 17.

Figure 7B:
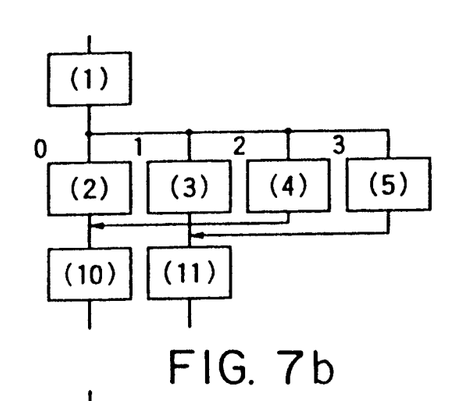

FIG. 7(b) shows another practical operation of the microprogram-controlled device. It will be assumed as follows. The microinstruction register 13 holds a current instruction (1) including the first and the second every second microinstruction addresses EAMIA1 and EAMIA2 which indicate addresses of decimal 128 and 512, respectively. The address modifying selection field 13-6 of the microinstruction register 13 is fixed in the address modifying selection signal AMS of the logic "0" level. That is, the every second microinstruction address modifier 17 carries out no address modification. In this event, the branch will proceed to a microinstruction (10) addressed by the address of decimal 128 when the every second microinstruction address selector 16 selects, as the selected microinstruction address SMIA, the first every second microinstruction address EAMIA1 of decimal 128 after either the 0-branch or the 2-branch. On the other hand, the branch will be followed by a microinstruction (11) addressed by the address of decimal 512 when the every second microinstruction address selector 16 selects, as the selected microinstruction address SMIA, the second every second microinstruction address EAMIA2 of decimal 512 after either the 1-branch or the 3-branch. In other words, both microinstructions (2) and (4) flow together with the microinstruction (10) while both microinstructions (3) and (5) flow together with the microinstruction (11).

Figure 7C:
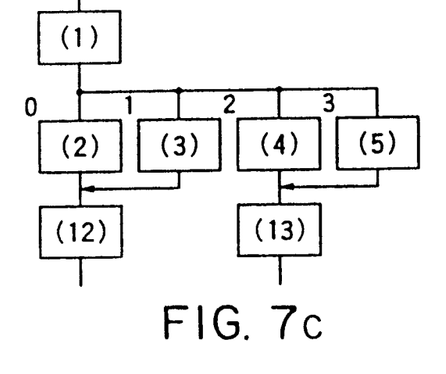

FIG. 7(c) shows still another practical operation of the microprogram-controlled device. It will be presumed as follows. The microinstruction register 13 holds a current instruction (1) including the first and the second every second microinstruction addresses EAMIA1 and EAMIA2 both of which indicate an address of decimal 128. The address modifying selection field 13-6 of the microinstruction register 13 is fixed in the address modifying selection signal AMS of the logic "1" level. Under the circumstances, the branch will be succeeded by a microinstruction (12) addressed by the address of decimal 128 after either the 0-branch or the 1-branch. On the other hand, the branch will proceed to a microinstruction (13) addressed by the address of decimal 160 after either the 2-branch or the 3-branch.

Figure 7D:
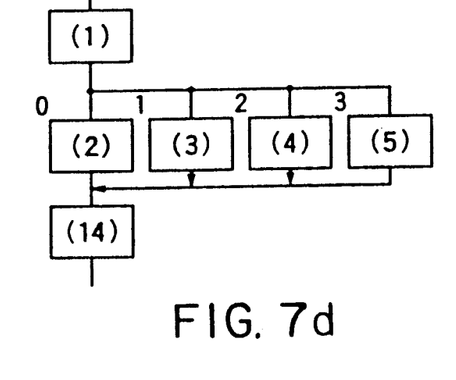

FIG. 7(d) shows yet another practical operation of the microprogram-controlled device. It will be assumed as follows. The microinstruction register 13 holds a current instruction (1) including the first and the second every second microinstruction addresses EAMIA1 and EAMIA2 both of which indicate an address of decimal 128. The address modifying selection field 13-6 of the microinstruction register 13 is fixed in the address modifying selection signal AMS of the logic "0" level. In this event, the branch will be followed by a microinstruction (14) addressed by the address of decimal 128 after all of the 0-branch, the 1-branch, the 2-branch, and the 3-branch. In other words, all of microinstructions (2), (3), (4), and (5) flow together with the microinstruction (14).

Description will proceed with roughly estimated calculations in order to clarify the contribution of the microprogram-controlled device illustrated in FIG. 3 to reduction of storage capacity of the control storage unit 11 in comparison with that of the control storage unit 11′ in the conventional microprogram-controlled device illustrated in FIG. 1.

It will be assumed in the conventional microprogram-controlled device as follows. The control storage unit 11′ has the storage capacity which is equal in word number to 3K words or 3,072 words. The microinstruction register 13′ consists of the microinstruction code field 13′-1, the branch classification field 13′-1, and the branch condition selection field 13′-3 all of which have eighty bits long, and the first through the fourth every second microinstruction address field 13′-4 to 13′-7 each of which has twelve bits long. Therefore, the control storage unit 11′ has the storage capacity which is equal in bit number to $(3{,}072 \times (12 \times 4 + 80))$ or 393,216 bits.

It will also be assumed as follows. Each of the control storage unit 11′ and 11 stores a microprogram comprising microinstructions, 10 per cent of which are four-way branch microinstructions whose 30 per cent, 15 per cent, 15 per cent, and 30 per cent occupy branches in the manner as illustrated in FIGS. 7(a), (b), (c), and (d), respectively, and the remaining 10 per cent occupies branches where three microinstructions flow together. After the four-way branch, the branch may on average occur to three-way or tridirectional.

The description will proceed to storage capacity of a control storage unit for use in a microprogramcontrolled device which is similar in structure and operation to the conventional microprogram-controlled device illustrated in FIG. 1 except that four every second microinstruction address fields 13'-4 to 13'-7 in the microinstruction register 13' are reduced to two every second microinstruction address fields. Under the circumstances, each microinstruction has 104 bits long. However, the microprogram operable in such a microprogram-controlled device cannot carry out branches in the manner as illustrated in FIGS. 7(b) and (d) and where three microinstructions flow together. In order to carry out the branches in the manner as illustrated in FIGS. 7(b) and (d) and where three microinstructions flow together, the microprogram-controlled device must increase the microinstructions by (3K ×0.1 ×0.15 ×(2 ×3)) or 270 words, (3K ×0.1 ×0.15 ×(2 ×3)) or 270 words, and (3K ×0.1 ×0.1 ×(2 ×3)) or 180 words, respectively, that is, a total of 720 words. As a result, the control storage unit of such a microprogram-controlled device must have storage capacity which is equal in word number to a total of (3,072 +720) or 3,792 words. Therefore, the control storage unit of such a microprogram-controlled device has the storage capacity equal in bit number to (3,792 ×104) or 394,368 bits which are approximately equal to that of the control storage unit 11'.

In the microprogram-controlled device illustrated in FIG. 3, each microinstruction has 105 bits long. In addition, the microprogram-controlled device must increase the microinstruction by 180 words alone in order to carry out the branches where three microinstructions flow together. As a result, the control storage unit 11 must have storage capacity which is equal in word number to a total of (3,072 +180 ) or 3,252 words. Therefore, the control storage unit 11 has the storage capacity equal in bit number to (3,252 ×105) or 341,460 bits that is smaller than that of the control storage unit 11' by about 13 per cent.

With the roughly estimated calculations described above, the microinstructions have the four-way branch microinstructions of 10 per cent. The higher this rate becomes, the smaller the storage capacity of the control storage unit 11 will become. In other words, it is possible to reduce the storage capacity of the control storage unit 11, when the control storage unit 11 stores the microprogram which may carry out a lot of multi-way branches, and much junctions and separations after the branches.

Figure 8:
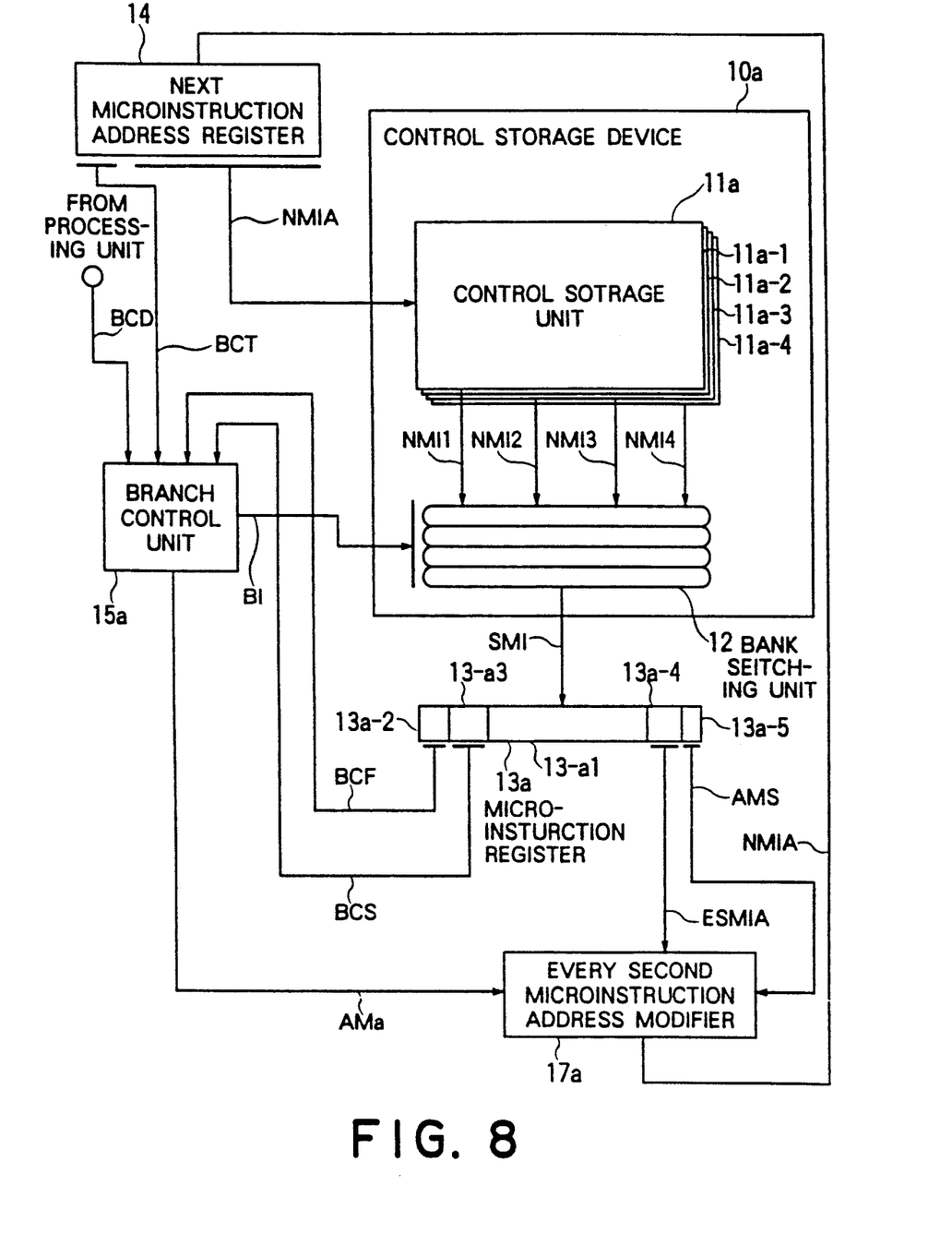
FIG. 8 is a block diagram of a microprogram-controlled device according to a second embodiment of the instant invention.

Referring to FIG. 8, the description will proceed to a microprogram-controlled device according to a second embodiment of this invention. The microprogramcontrolled device is operable under the control of a microprogram and comprises a control storage device 10a, a microinstruction register 13a, a next microinstruction address register 14, a branch control unit 15a, and an every second microinstruction address modifier 17a which are similar to those in the microprogram-controlled device illustrated in FIG. 3 but comprises no every second microinstruction address selector. In the manner which will later become clear, the microprogram can branch to any one of one-way, two-way, and four-way.

The control storage device 10a comprises a control storage unit 11a and a bank switching unit 12 which are similar to those in the microprogram-controlled device illustrated in FIG. 3. The control storage unit 11a consists of four banks or first through fourth banks 11a-1, 11a-2, 11a-3, and 11a-4 and memorizes or stores a plurality of microinstructions which compose the microprogram. In the manner which will later become clear, each of the microinstructions stored in the control storage unit 11a includes only one every second microinstruction address.

In the manner which will later become clear, the control storage unit 11a is accessed by a next microinstruction address NMIA to simultaneously produce first through fourth next microinstructions NMI1, NMI2, NMI3, and NMI4 by the first through the fourth banks 11-1a to 11-4a, respectively. Each of the first through the fourth next microinstructions NMI1 to NMI4 is a microinstruction to be executed following a current microinstruction being currently executed. The first through the fourth next microinstructions NMI1 to NMI4 are supplied to the bank switching unit 12. The bank switching unit 12 is supplied with a branch information signal BI which will be described as the description proceeds. On the basis of the branch information signal BI, the bank switching unit 12 selects one of the first through the fourth next microinstructions NMI1 to NMI4 as a selected microinstruction SMI. In other words, the bank switching unit 12 allows the control storage device 10a to be switched between the first through the fourth banks 11a-1 to 11a-4. The bank switching unit 12 therefore serves as a microinstruction selecting arrangement.

The selected microinstruction SMI is supplied to the microinstruction register 13a. The microinstruction register 13a holds the selected microinstruction SMI as the current microinstruction.

Figure 9:
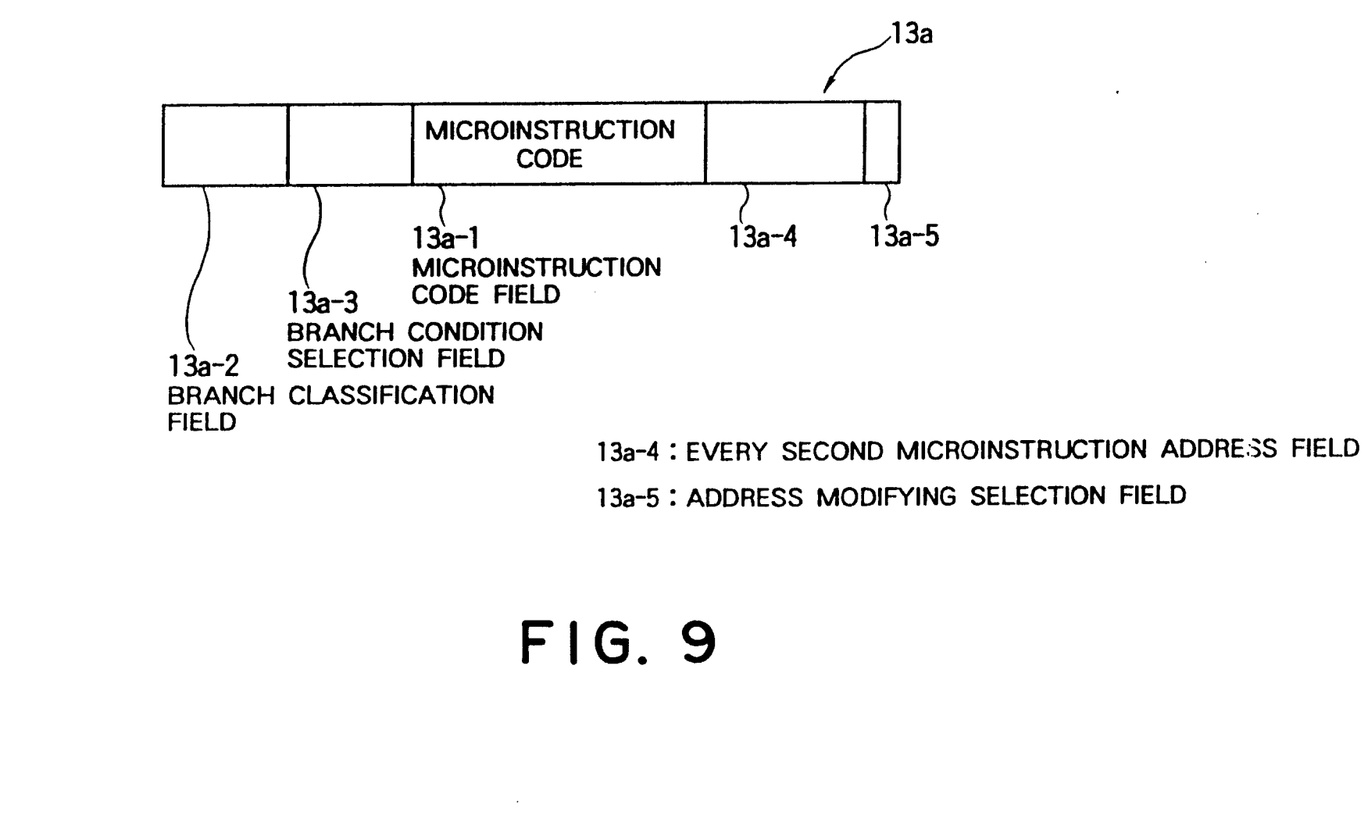
FIG. 9 is a view for use in describing a microinstruction register included in the microprogram-controlled device illustrated in FIG. 8.

Turning to FIG. 9, the microinstruction register 13a is divided into five fields, namely, a microinstruction code field 13a-1, a branch classification field 13a-2, a branch condition selection field 13a-3, an every second microinstruction address field 13a-4, and an address modifying selection filed 13a-5 which are depicted also in FIG. 8. The microinstruction code field 13a-1 is for storing a microinstruction code. The branch classification field 13a2 is for storing branch classification information indicative of a classification of a branch. The branch condition selection field 13a-3 is for storing branch condition selection information indicative of a selection of branch conditions. The every second microinstruction address field 13a-4 is for storing an every second microinstruction address for every second microinstructions to be executed two steps after the current microinstruction. The address modifying selection field 13a-5 is for storing address modifying selection information indicative of whether or not the every second microinstruction address is modified.

Turning back to FIG. 8, the microinstruction register 13a produces a microinstruction code signal indicative of the microinstruction code in the microinstruction code filed 13a1. The microinstruction code signal is supplied to a processing unit such as an adder (not shown). The processing unit processes the microinstruction code signal into a branch condition signal BCD. The microinstruction register 13a furthermore produces a branch classification signal BCF indicative of the branch classification information in the branch classification field 13a-2, a branch condition selection signal BCS indicative of the branch condition selection information in the branch condition selection field 13a-4, the every second microinstruction address ESMA in the every second microinstruction address field 13a-4, and an address modifying selection signal AMS indicative of the address modifying selection information in the address modifying selection field 13a-5.

The next microinstruction address register 14 holds the next microinstruction address NMIA for the next microinstructions. The next microinstruction address register 14 supplies the next microinstruction address NMIA to the control storage unit 11a to make the control storage unit 11a produce the first through the fourth next microinstructions NMI1 to NMI4. The next microinstruction address register 14 furthermore produces a part of the next microinstruction address NMIA as a branch control signal BCT.

It will be assumed that the every second microinstruction address consists of thirteen bits. In the every second microinstruction address, bits 6 and 7 are two predetermined specific bits modified by the every second microinstruction address modifier 17a.

The branch control unit 15a is supplied with the branch condition signal BCD from the processing unit. The branch control unit 15a is also supplied with the branch control signal BCT from the next microinstruction address register 14. The branch control unit 15a is furthermore supplied with the branch classification signal BCF and the branch condition selection signal BCS from the microinstruction register 13a. The branch control unit 15a processes the branch condition signal BCD, the branch control signal BCT, the branch classification signal BCF, and the branch condition selection signal BCS into the branch information signal BI and an address modifying signal AMa. The branch information signal BI indicates an address for one of the first through the fourth banks 11a-1 to 11a-4 that corresponds to the microinstruction to be branched.

The branch control unit 15a produces a signal of the logic "0" level as the address modifying signal AMa on carrying out the one-way branch. The branch control unit 15a produces a signal of the logic "1" level as the address modifying signal AMa on carrying out either the two-way branch or the four-way branch. That is, the address modifying signal AMa has a logic value according to Table 3.

TABLE 3

| address modifying signal AMa | | |
|---|---|---|
| one-way branch | two-way branch | four-way branch |
| 0 | 1 | 1 |

While this invention has thus far been described in conjunction with two preferred embodiments thereof, it will now be readily possible for one skilled in the art to develop various other embodiments of this invention. For example, each microinstruction may include one or more every second microinstruction address(es) which are in number less than the maximum number of available branches for the microprogram.

What is claimed is:

1. A microprogram-controlled device operable under the control of a microprogram and comprising:

a control storage device comprising a control storage unit for memorizing a plurality of microinstructions which compose said microprogram, each of said microinstructions including a plurality of every second microinstruction addresses for microinstructions to be executed two steps after a current microinstruction being currently executed, branch classification information indicative of a classification of a branch, branch condition selection information indicative of a selection of branch conditions, and address modifying selection information indicative of whether or not said every second microinstruction addresses are modified, said every second microinstruction addresses being in number less than the maximum number of available branches for said microprogram, said control storage unit simultaneously producing a plurality of next microinstructions in response to a next microinstruction address, said control storage device comprising microinstruction selecting means for selecting, as a selected microinstruction, one of said next microinstructions on the basis of a branch information signal;

microinstruction holding means connected to said control storage device for holding said selected (claim 1 continued) microinstruction as said current microinstruction, said microinstruction holding means producing said every second microinstruction addresses, a branch classification signal indicative of said branch classification information, a branch condition selection signal indicative of said branch condition selection information, and an address modifying selection signal indicative of said address modifying selection information;

next microinstruction address holding means connected to said control storage device for holding said next microinstruction address for the next microinstructions to be executed following said current microinstruction, said next microinstruction address holding means supplying said next microinstruction address to said control storage unit to make said control storage unit produce said next microinstructions, said next microinstruction address holding means producing a part of said next microinstruction address as a branch control signal;

branch control means supplied with a branch condition signal, and connected to said microinstruction holding means, said next microinstruction address holding means, and said control storage device for processing said branch condition signal, said branch control signal, said branch classification signal, and said branch condition selection signal into said branch information (claim 1 twice continued) signal, an address selection signal, and an address modifying signal;

every second microinstruction address selecting means connected to said microinstruction holding means and said branch control means for selecting, as a selected microinstruction address, one of said every second microinstruction addresses on the basis of said address selection signal; and every second microinstruction address modifying means connected to said every second microinstruction address selecting means, said branch control means, said microinstruction holding means, and said next microinstruction address holding means for modifying said selected microinstruction address into a modified microinstruction address on the basis of said address modifying signal and said address modifying selection signal, said every second microinstruction address modifying means supplying said next microinstruction address holding means with said modified microinstruction address.

2. A microprogram-controlled device as claimed in claim 1, wherein said every second microinstruction address modifying means modifies said selected microinstruction address into said modified microinstruction address by setting a predetermined value in a specific bit of said selected microinstruction address.

3. A microprogram-controlled device as claimed in claim 1, wherein said control storage unit simultaneously produces said next microinstructions which are equal in number to four and each of said microinstructions includes said every second microinstruction address fields which are equal in number to two.

4. A microprogram-controlled device operable under the control of a microprogram and comprising:

a control storage device comprising a control storage unit for memorizing a plurality of microinstructions which compose said microprogram, each of said microinstructions including an every second microinstruction address for microinstructions to be executed two steps after a current microinstruction being currently executed, branch classification information indicative of a classification of a branch, branch condition selection information indicative of a selection of branch conditions, and address modifying selection information indicative of whether or not said every second microinstruction address is modified, said control storage unit simultaneously producing a plurality of next microinstructions in response to a next microinstruction address, said control storage device comprising microinstruction selecting means for selecting, as a selected microinstruction, one of said next microinstructions on the basis of a branch information signal; (claim 4 continued)

microinstruction holding means connected to said control storage device for holding said selected microinstruction as said current microinstruction, said microinstruction holding means producing said every second microinstruction address, a branch classification signal indicative of said branch classification information, a branch condition selection signal indicative of said branch condition selection information, and an address modifying selection signal indicative of said address modifying selection information;

next microinstruction address holding means connected to said control storage device for holding said next microinstruction address for the next microinstructions to be executed following said current microinstruction, said next microinstruction address holding means supplying said next microinstruction address to said control storage unit to make said control storage unit produce said next microinstructions, said next microinstruction address holding means producing a part of said next microinstruction address as a branch control signal;

branch control means supplied with a branch condition signal, and connected to said microinstruction holding means, said next microinstruction address holding means, and said control storage device for processing said branch condition signal, said branch control signal, (claim 4 twice continued) said branch classification signal, and said branch condition selection signal into said branch information signal and an address modifying signal; and every second microinstruction address modifying means connected to said branch control means, said microinstruction holding means, and said next microinstruction address holding means for modifying said every second microinstruction address into a modified microinstruction address on the basis of said address modifying signal and said address modifying selection signal, said every second microinstruction address modifying means supplying said next microinstruction address holding means with said modified microinstruction address.

5. A microprogram-controlled device as claimed in claim 4, wherein said every second microinstruction address modifying means modifies said every second microinstruction address into said modified microinstruction address by modifying predetermined specific bits of said every second microinstruction address.

* * * * *